US008795828B2

(12) United States Patent
Grozdanich et al.

(10) Patent No.: US 8,795,828 B2
(45) Date of Patent: Aug. 5, 2014

(54) ENCAPSULATED PREFORMED SHAPES

(75) Inventors: Rod Alan Grozdanich, Liberty Lake, WA (US); Edward Robert Kaczmarek, Spokane, WA (US)

(73) Assignee: Spokane Industries, Spokane, WA (US)

( * ) Notice: Subject to any disclaimer, the term of this patent is extended or adjusted under 35 U.S.C. 154(b) by 178 days.

(21) Appl. No.: 13/563,477

(22) Filed: Jul. 31, 2012

(65) Prior Publication Data

US 2014/0037871 A1 Feb. 6, 2014

(51) Int. Cl.
*B23Q 23/00* (2006.01)
*B23Q 27/00* (2006.01)
*B32B 5/16* (2006.01)

(52) U.S. Cl.
CPC ............... *B23Q 23/00* (2013.01); *B23Q 27/00* (2013.01); *B32B 5/16* (2013.01)
USPC ............ 428/325; 428/34.1; 428/99; 428/323; 428/545

(58) Field of Classification Search
CPC ......... B02Q 23/00; B02Q 27/003; B32B 5/16
USPC ........................ 428/34.1, 99, 325, 323, 545
See application file for complete search history.

(56) References Cited

U.S. PATENT DOCUMENTS

| 5,361,678 | A | 11/1994 | Roopchand et al. |
| 5,743,033 | A | 4/1998 | Gegel |
| 6,112,635 | A | 9/2000 | Cohen |
| 2009/0114083 | A1 | 5/2009 | Moore, III et al. |
| 2011/0290616 | A1 | 12/2011 | Tenold et al. |

OTHER PUBLICATIONS

The PCT Search Report and Written Opinion mailed Sep. 25, 2013 for PCT application No. PCT/US2013/048335, 13 pages.

*Primary Examiner* — Michael C Miggins
(74) *Attorney, Agent, or Firm* — Lee & Hayes, PLLC

(57) ABSTRACT

Composite wear parts including encapsulated preformed ceramic shapes are disclosed. Preformed ceramic shapes are embedded in a metal alloy to protect the base metal from abrasion. The preformed ceramic shapes may have a uniform, preformed geometry that provides for packing the preformed ceramic shapes together in a uniform way. The preformed ceramic shapes may be positioned at a location in the composite wear part exposed to an abrasion without using a binding agent. The preformed ceramic shapes may also be contained in a porous container. A truss structure may be integrated in the preformed ceramic shapes to compartmentalize the preformed ceramic shapes into multiple isolated sub regions to stiffen the composite wear parts.

21 Claims, 6 Drawing Sheets

ENCAPSULATED PREFORMED SHAPES

BACKGROUND

Wear resistant components are desirable in a variety of industrial, commercial, and military applications. For example, mining, construction, heavy equipment, automotive, military, and other applications rely on components that are resistant to wear.

Recently, composite components formed of multiple materials having different material properties (i.e., high hardness and toughness) have been used.

However, manufacturing composite components is often challenging due to the different properties of materials used to form the composite components. For example different materials often have different handling properties. A material that works well for one manufacturing process may not be compatible with another manufacturing process. For example, a relatively hard fine-grained material may not be compatible with a manufacturing process where the relatively fine-grained material is to be precisely placed in a base material. As such, to precisely place the fine-grained material in the base material, additional mechanisms and/or steps may be required in the manufacturing process to produce the component, thereby increasing the component's costs.

Thus, there remains a need to develop new composite components and methods of manufacturing such composite components.

BRIEF SUMMARY

This Brief Summary is provided to introduce simplified concepts relating to techniques for manufacturing composite wear parts comprising encapsulated preformed ceramic shapes, which are further described below in the Detailed Description. This Summary is not intended to identify essential features of the claimed subject matter, nor is it intended for use in determining the scope of the claimed subject matter.

This disclosure relates to composite parts that are subject to wear (so called "wear parts"), and techniques for manufacturing such composite wear parts. The composite wear parts include encapsulated preformed ceramic shapes, cast in situ or otherwise encapsulated in a base metal. The encapsulated preformed ceramic shapes are more easily handled or manipulated during manufacturing processes than handling smaller fine-grained materials. Because the encapsulated preformed ceramic shapes are more easily handled, the mechanisms and/or steps required in the manufacturing process to produce the composite wear parts are reduced compared to handling the smaller fine-grained material, thereby reducing the cost of the composite wear parts.

The composite wear parts may be configured to withstand, resist, or protect against abrasion and/or impacts. The composite components exhibit improved resistance to wear and, therefore, have longer usable life than wear parts formed of a base metal alone. Composite wear parts may be used to improve a usable life of virtually any wear part. For example, the composite wear parts may be used as impact crusher wear parts, mining wear parts, oil field wear parts, construction wear parts, or any other industry utilizing parts and/or machinery in abrasive conditions.

In some examples a composite wear part may be used to provide abrasion resistance for a tool. For example, a composite wear part may be used to provide abrasion resistance for a chute, a liner, a blade, a bucket, a track, a shroud, a tooth, a bit, or any other wear part exposed to abrasion.

In other examples a composite wear part may be used to provide abrasion resistance for a piece of equipment. For example, a composite wear part may be used to provide abrasion resistance for a conveyor system, an excavator, a tracked vehicle, a haul truck, or any other equipment needing abrasion resistance.

In some examples, composite wear parts may comprise a plurality of preformed ceramic shapes embedded in a base metal. The plurality of preformed ceramic shapes may be formed of a ceramic, having a higher material hardness than the base metal, that when exposed to abrasion provides increased resistance to the abrasion than the base metal alone. Moreover, the shape of the ceramic components may be chosen to provide a lattice-like or crystalline-like structure when packed together tightly to prevent the preformed ceramic shapes from sliding relative to each other.

Moreover, the shape of the ceramic preformed shapes may be chosen to prevent the ceramic preformed shapes from being dislodged from the base metal as the base metal wears out around the ceramic components. For example, the preformed ceramic shapes may have a geometric shape that anchors the ceramic components in the base metal, retaining the ceramic component in the base metal until the ceramic component is worn down by the abrasion. Further the preformed shapes may have retaining features that anchor or retain the shapes in the base metal. For example, the preformed ceramic shapes may have through holes, bumps, ridges, tapers, channels, etc. that interlock with the base metal to retain the preformed ceramic shapes in the base metal.

In some examples the preformed ceramic shapes may be arranged in one or more layers of uniform arrays of preformed ceramic shapes configured to pack together in a uniform way. For example, the preformed ceramic shapes may include a plurality of elements having a uniform, preformed geometry, the preformed geometry being such that the plurality of preformed ceramic shapes are configured to pack together in a uniform way to be positioned at a location in the composite wear part that is exposed to an abrasion.

In some examples, the multiple layers of uniform arrays of preformed ceramic shapes may increase a total depth or thickness of ceramic material exposed to an abrasion, thereby extending a usable life of the composite wear part. For example, two or more layers of arrays of preformed ceramic shapes may be arranged in an adjacent, subjacent, and/or overlapping manner. The layers of arrays of preformed ceramic shapes may be arranged such that a preformed ceramic shape in a top layer covers, minimizes, or eliminates an interstitial space between preformed ceramic shapes in a lower layer. The top layer may be exposed to an abrasion first, eventually wearing down to the lower layer, after which the lower layer is then exposed to the abrasion.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
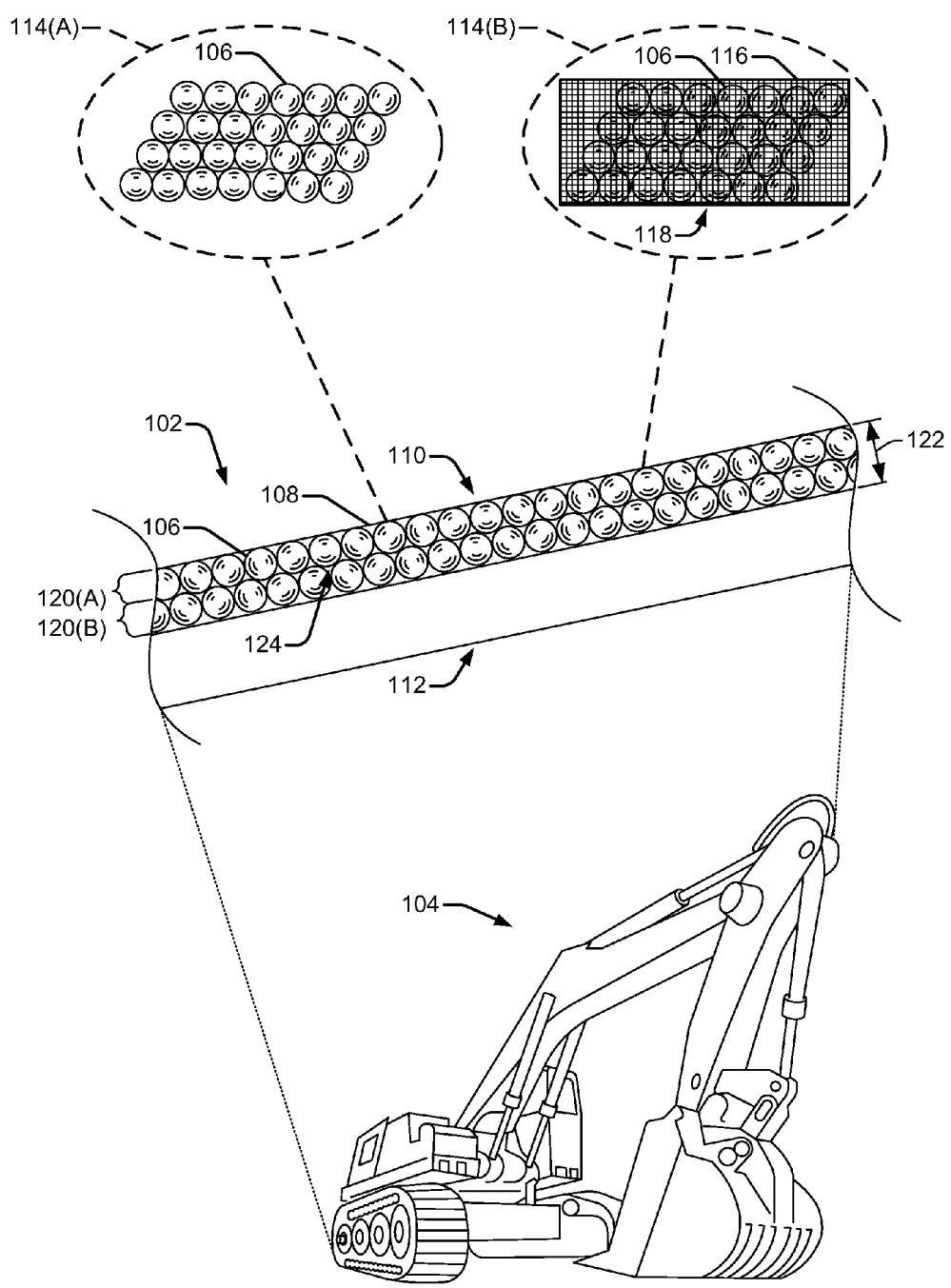
FIG. 1 illustrates an excavator having an example composite wear part including a plurality of preformed ceramic shapes embedded in the base metal, and which may include one or more layers of uniform arrays of preformed ceramic shapes configured to pack together in a uniform way.

As noted above, manufacturing of composite components is often difficult due to the varying material properties of the materials from which the composite component is made. This application describes composite wear parts comprising preformed ceramic shapes embedded in an iron alloy that, together, provide resistance to abrasion, and require simpler and/or fewer containment mechanisms and/or manufacturing procedures to produce. This application describes techniques for manufacturing such composite wear parts using investment casting techniques. However, other casting techniques may also be used. By way of example and not limitation, the composite wear parts herein may be used in the fields of mining, drilling, construction, or any other applications that may be exposed to abrasion and/or impacts.

In general, the composite wear parts include a plurality of preformed ceramic shapes embedded in a base metal. The base metal may substantially permeate the plurality of preformed ceramic shapes. The base metal may be a relatively tough wear resistant or structural iron based alloy (e.g., stainless steel, AISI 1025, AISI 8630, AISI 4140, AISI 4320, high chrome iron or white iron, and/or FeMnAl alloys).

The composite wear parts may include a mechanism to removeably couple the composite wear part to a tool and/or a piece of equipment to provide for replacing the composite wear part. For example, a composite wear part may include a portion of metal configured to be welded to a tool or a piece of equipment and configured to be cut from the tool or piece of equipment when the composite wear part is expired or worn out. Further, the composite wear part may be bolted, screwed, coupled, etc. to a tool or equipment via fasteners, threaded connection, grooves and/or notches, or any other mechanism suitable for removeably coupling a wear part to a tool and/or a piece of equipment.

The preformed ceramic shapes may include a uniform, preformed geometry. For example, the preformed ceramic shapes may include a uniform, preformed geometry comprising a substantially shaped sphere. Depending on the specific application, the preformed geometry may be a substantially shaped cone, a substantially shaped jack, a substantially shaped half sphere, a substantially shaped cube, a substantially shaped pyramid, a bonded unit (e.g., bonded substantially shaped spheres, boned substantially shaped sphere and substantially shaped cone, bonded substantially shaped sphere and substantially shaped jack, bonded substantially shaped half spheres, etc.). For example, the preformed geometry may be chosen to provide for packing the preformed ceramic shapes together in a uniform way to provide for being positioned at a location in the composite wear part exposed to an abrasion.

Further, the preformed geometry may be chosen to provide for packing the preformed ceramic shapes together to form a lattice structure, simulating a crystalline structure that imparts stiffness to the composite wear part. That is, the preformed geometry may be chosen to allow the preformed ceramic shapes to be packed together to prevent or limit an amount by which the preformed ceramic shapes can be displaced relative to one another. For example, the preformed ceramic shapes may interfere or abut with one another when the composite wear part is deformed or displaced. Because the preformed ceramic shapes interfere with one another during deformation of the composite wear part, and are formed of a harder material than that of the base metal of the composite wear part, the preformed ceramic shapes resist being deformed or displaced, thereby increasing the stiffness of the composite wear part as compared to a composite wear part made of the base metal alone.

In an example where the preformed geometry is a sphere, the preformed ceramic shapes may comprise solid, substantially spherical shaped units (e.g., marbles) of ceramic that are arranged in contiguous arrays. As used herein, a substantially spherical shaped unit includes a substantially round geometrical solid ceramic unit in three-dimensional space. For example, a series of silicon carbide marbles may be arranged in contact with one another to form a layer of an array of preformed ceramic shapes. In some examples, the spherical shaped unit of ceramic may have a diameter of about 0.5 inches (1.3 centimeters). In other examples, the spherical shaped unit of ceramic may have a diameter of at least about 0.25 inches (0.6 centimeters) to at most about 0.75 inches (1.9 centimeters). The diameter may vary depending on the specific application. The substantially spherical shaped unit may include flat spots, dimples, and/or bumps etc., over a portion of the surface of the substantially spherical shaped unit. For example, the substantially spherical shaped unit may include flat spots, dimples, and/or bumps etc., over less than about 20% of the surface.

In some embodiments the preformed geometries may be chosen to provide for retaining the preformed ceramic shapes in the base metal. That is, the preformed geometry may be chosen to allow the preformed ceramic shapes to be anchored or retained in the base metal as abrasion removes the base metal from around the preformed ceramic shapes. For example, the preformed ceramic shapes may include retaining features (e.g., a through hole, a taper, a protrusion, etc.) that are shaped to be anchored or hooked in the encapsulating base metal. Because the retaining features are anchored or hooked in the encapsulating base metal, the retaining features keep the preformed ceramic shapes embedded in the base metal as the preformed ceramic shapes are worn down or reduced in size, instead of being dislodged prematurely from the wearing base metal.

In some embodiments, one or more layers of uniform arrays of preformed ceramic shapes may be arranged in an overlapping manner. For example, a top layer array of preformed ceramic shapes may be arranged above a bottom layer array of preformed ceramic shapes such that any interstitial space between contiguous preformed ceramic shapes is minimized. For instance, a preformed ceramic shape arranged in the top layer may cover an interstitial space between two preformed ceramic shapes in the bottom layer arranged below the preformed ceramic shape in the top layer. By having one or more layers of uniform arrays of preformed ceramic shapes arranged in an overlapping manner, once the top layer is worn out (i.e., at an end of the preformed ceramic shapes wear life), the bottom layer is subsequently exposed to the abrasion, which extends the usable life of the composite wear parts.

In some embodiments, one or more channels, void of preformed ceramic shapes may be arranged in the one or more layers of uniform arrays of preformed ceramic shapes to receive a base metal during a casting of the composite wear parts. For example, one or more channels may be arranged or formed in a porous container to receive the base metal during the casting of the composite wear part. The porous container may be made of metal wire or fabric that can maintain their structural integrity when exposed to a molten metal. The base metal received by the channels may form a truss structure that compartmentalizes the preformed ceramic shapes into multiple isolated sub regions within the composite wear part to stiffen the composite wear part. For example, the truss structure may provide for applying a compression force to the compartmentalized preformed ceramic shapes during a solidification of the base metal. The compression force applied during the solidification of the base metal may compress the preformed ceramic shapes into a tighter lattice structure than if the same porous body were made without the truss structure. The preformed ceramic shapes may be made of alumina, zirconia, tungsten carbide, titanium carbide, boron carbide, zirconia-toughened alumina (ZTA), partially stabilized zirconia (PSZ) ceramic, silicon oxides, aluminum oxides with carbides, titanium oxide, brown fused alumina, combinations of any of these, or the like.

In examples where the preformed ceramic shapes are formed of silicon carbide, the preformed ceramic shapes may be coated with one or more barrier layers or coatings to prevent interaction or reaction between the preformed ceramic shapes and the molten metal during the casting process. In one example, an interaction or reaction between the preformed ceramic shapes and the molten metal during the casting process may be characterized as a reaction between a molten metal comprising a steel alloy and the preformed ceramic shapes formed of silicon carbide. For example, during a casting process, a molten steel alloy may have a temperature of about 2732 degrees F. and may undesirably react with the ceramic element formed of silicon carbide. During the reaction, the steel alloy may react undesirably with the silicon carbide to form graphite. Further, multiple reaction layers at an interface between the solidified steel alloy and the silicon carbide may be produced during the reaction. In addition to the above, the steel alloy may penetrate the silicon carbide to some depth. All of these results compromise the integrity of the preformed ceramic shapes.

As such, casting preformed ceramic shapes formed of silicon carbide encapsulated with a steel alloy without utilizing one or more barrier layers or coatings during the casting process results in a compromised assembly. For example, casting a steel alloy onto preformed ceramic shapes formed of silicon carbide without utilizing one or more barrier layers or coatings may result in compromised preformed ceramic shapes (e.g., partially "dissolved" preformed ceramic shapes) encapsulated by a compromised steel alloy casing (e.g., cracked casing). To prevent the interaction or reaction between dissimilar materials during a casting process, a barrier layer and/or coating may be applied to the preformed ceramic shapes prior to casting the metal around the preformed ceramic shapes. The barrier layer and/or coating may provide an interface or zone that prevents the interaction or reaction between the preformed ceramic shapes and molten metal during a casting process.

In an example, where the barrier layer or coating may prevent the interaction or reaction between the preformed ceramic shapes and the molten metal, the barrier layer(s) or coating(s) may comprise, for example, a refractory layer encapsulating each preformed ceramic shape. For example, the refractory layer may comprise a metal film. The metal film may be, for example, a foil layer, a powder coat, an electroplating, a painted layer, dipped layer, etc. encapsulating the preformed ceramic shapes. In one specific example, preformed ceramic shapes may be wrapped in an aluminum foil layer.

In some embodiments, the barrier layer and/or coating may additionally or alternatively provide crush or compression protection between the preformed ceramic shapes and the base metal to allow for shrinkage of the encapsulating metal during and after solidification. For example, the preformed ceramic shapes and the base metal may have different coefficients of thermal expansion and the base metal may shrink disproportionately more relative to the preformed ceramic shapes. Specifically, the base metal may have a higher shrinkage percentage than a preformed ceramic shape. Stated otherwise, the preformed ceramic shape may shrink less than the base metal as the preformed ceramic shape and the base metal cool after solidification of the base metal. Because the preformed ceramic shape may shrink less than the base metal, the base metal may shrink down onto the preformed ceramic shape, resulting in the base metal being in tension and the preformed ceramic shape being in compression. The resulting compression force may be sufficient to cause damage to the preformed ceramic shape, and the resulting tension force may be sufficient to cause damage to base metal. For example, the resulting compression force may be sufficient to crack the preformed ceramic shapes and the resulting tension force may be sufficient to tear the base metal. Damage in either or both of the preformed ceramic shapes and the base metal may compromise or detract from the performance of the composite wear part. The barrier layer and/or coating may provide an interface or zone that dampens the compression force during shrinkage of the solidified base metal, preventing cracking and/or voids from forming in either or both of the preformed ceramic shapes and base metal. That is the barrier layer may be crushable or compressible to allow the base metal to shrink around the ceramic elements without damaging the preformed ceramic shapes or the base metal.

In an example, where the barrier layer or coating may provide crush or compression protection between the preformed ceramic shapes and the base metal during shrinkage after solidification, the barrier layer(s) or coating(s) may comprise, for example, a compressible, porous coating comprising alumina fiber, ceramic, copper, nickel, or the like. For example, porous coatings formed of fibers, granules, powders, etc. may include interstitial spaces that when crushed or compressed, reduce in size or volume.

In some embodiments, the barrier layer or coating may comprise more than one layer or coating to prevent interaction or reaction between the preformed ceramic shapes and the molten metal during the casting process, and to provide a crush or a compression protection between the preformed ceramic shapes and the molten metal during the casting process. For example, the barrier layer or coating may include a first layer (e.g., refractory layer) and a second layer (e.g., compressible layer).

In an example where the barrier layer or coating may prevent interaction or reaction and provide a crush or a compression protection between the preformed ceramic shapes and the molten metal during the casting process, the first layer may encapsulate the second layer.

Further, a wall thickness of the barrier layer or coating may vary depending on the specific application and/or on a density of the barrier layer. For example, the wall thickness may be dependent on thermal expansion coefficients of a base metal and a ceramic material to be accommodated. In a specific example, the base metal may be formed of an iron alloy (e.g., FeMnAl) that encapsulates preformed ceramic shapes formed of silicon carbide.

The encapsulating metal may comprise a relatively tough steel alloy, such as FeMnAl, stainless steel, 4140 AISI steel, or 8630 AISI steel. As used herein, the term "steel" includes alloys of iron and carbon, which may or may not include other constituents such as, for example, manganese, aluminum, chromium, nickel, molybdenum, copper, tungsten, cobalt, and/or silicon. As used herein, the term FeMnAl includes any iron based alloy including at least about 3% manganese by weight, and at least about 1% aluminum by weight. In another specific example, high-chrome iron (or white iron) may be used as a base metal for an encapsulating metal. In other examples, still other base metals (e.g., titanium, etc.) may be used to encapsulate preformed ceramic shapes according to this disclosure.

Ranges of what is considered "relatively hard" and "relatively tough" may vary depending on the application, but in one example "relatively hard" materials are those having a Vickers Hardness of at least about HV=1300 (13 GPa) or a Knoop hardness of at least about HK=800 (2.7 GPa), and "relatively tough" materials are those having a an impact toughness of at least about 10 ft-lbs at −40 degrees F. and/or a tensile strength of at least about 80,000 psi in the "as cast," non-heat treated state. In some examples, relatively tough materials may have an impact toughness of at least about 20 ft-lbs at −40 degrees F. and/or a tensile strength of at least about 100,000 psi in the "as cast," non-heat treated state. To be clear, however, this disclosure is not limited to using materials having the foregoing ranges of hardness or toughness.

These and other aspects of the composite wear parts comprising preformed ceramic shapes will be described in greater detail below with reference to several illustrative embodiments.

Example Composite Wear Parts

This section describes exemplary composite wear parts including a plurality of preformed ceramic shapes embedded in a base metal.

In some implementations, the plurality of preformed ceramic shapes may include a plurality of elements having a uniform, preformed geometry. The preformed geometry being such that the plurality of preformed ceramic shapes are configured to pack together in a uniform way to provide for being positioned at a location in the composite wear part exposed to an abrasion. These and numerous other composite wear parts can be formed according to the techniques described in this section.

Metal/ceramic composite materials are well suited to abrasion-resistant applications due to the characteristics of the materials. For example, metals typically provide a relatively high strength-to-weight ratio and a high toughness, while ceramics have a relatively high hardness.

FIG. 1 is a side view diagram of a composite wear part 102 used, for example, as abrasion resistance on a piece of equipment 104. While FIG. 1 illustrates the piece of equipment 104 as being an excavator, the piece of equipment 104 may be any type of equipment used in a variety of industrial, commercial, and military applications. For example, the piece of equipment 104 may be a piece of equipment configured to operate in mining, exploration, construction, military, and other applications that are susceptible to wear from abrasion. The piece of equipment 104 may be, for example, an excavator, a conveyor system, a tracked vehicle, a haul truck, a crane, a crusher, an aircraft, a ship, an engine, or the like exposed to abrasion.

The composite wear part 102 may be any type of wear part and used to provide abrasion resistance for the piece of equipment 104 and/or a tool. For example, the composite wear part 102 may be used to provide abrasion resistance for a chute, a bucket, a track, a tooth, a blade, a bit, a coupler, a thumb, a liner, a shroud, a chain, a sprocket, or a hammer, or any other tool that is exposed to abrasion and/or impacts.

As shown in FIG. 1, the composite wear part 102 comprises a plurality of preformed ceramic shapes 106 embedded in a base metal 108. As shown in the side view, the composite wear part 102 may include a wear surface 110 opposite a mounting surface 112. In this embodiment, the wear surface 110 of the composite wear part 102 is substantially parallel to the mounting surface 112 of the composite wear part 102. However, in other embodiments, the wear surface 110 and the mounting surface 112 of the composite wear part 102 need not be parallel and may be arranged in any orientation relative to one another. For example, the composite wear part 102 may be any number of geometric shapes and may comprise any number of features depending on an intended use of the composite wear part 102. For example, an intended use of a composite wear part 102 may be to be used as a tooth on a bucket of an excavator, and as such, the wear surface may be sloped or curved relative to a sloped or curved mounting surface of the tooth. The composite wear part 102 may be installed on, in, or around, the piece of equipment 104 so that the wear surface 110 is in exposed to an abrasion.

As shown in the side view, the preformed ceramic shapes 106 may be arranged in one or more layers 120(A) and 120(B) of uniform arrays of preformed ceramic shapes 106. The preformed ceramic shapes 106 may include a plurality of elements having a uniform, preformed geometry (discussed in more detail below with respect to FIG. 2), the preformed geometry being such that the plurality of preformed ceramic shapes 106 are configured to pack together in a uniform way. Because the preformed ceramic shapes are configured to pack together in a uniform way, the preformed ceramic shapes provide for being manipulated and/or handled to be positioned at a location in the composite wear part that is exposed to an abrasion. As illustrated in top view 114(A), in one example, uniformly packed preformed ceramic shapes 106 may comprise preformed ceramic shapes 106 packed together in a desired shape and/or size. Because the preformed ceramic shapes 106 are configured to pack together in a uniform way, the preformed ceramic shapes 106 may hold together without a containment structure (i.e., metal mesh, a ceramic mesh, a fabric) and/or adhesive or binding agent. Thus, the preformed ceramic shapes 106 may be more easily handled and positioned at a location in the composite wear part 102 than relatively fine-grained materials. In other examples, a adhesive or binding agent may be used.

As illustrated in top view 114(B), in another example, uniformly packed preformed ceramic shapes 106 may comprise a porous container 116, permeable to molten metal that may retain the plurality of preformed ceramic shapes 106. For example, a metal mesh, a ceramic mesh, a fabric, or other suitable structure may retain the plurality of preformed ceramic shapes 106 in a desired shape during a casting process. Also, in one embodiment, the porous container 116 may only need to maintain structural integrity for a small period of time when exposed to the molten metal and may not need to maintain perfect structural integrity for the entire casting process. Additionally, the porous container 116 may melt or dissolve during the casting process but resist the molten metal long enough such that the preformed ceramic shapes 106 are secured in the desired location prior to melting or dissolving of the porous container 116. Examples of porous containers 116 include, without limitation, steel or other metal meshes or wire frames, high temperature fabrics (e.g., those made of Teflon®, Kevlar®, or the like), or ceramic meshes or frames.

The plurality of preformed ceramic shapes 106 retained by the porous container 116 define a porous body 118. The porous body 118 may provide for positioning the plurality of preformed ceramic shapes 106 at a location in the composite wear part 102. For example, the porous body 118 may be fastened in a casting mold that may be formed or arranged to facilitate the casing of a composite wear part 102 of various geometries. The porous body 118 may be fastened to a sand mold at a location to constrain preformed ceramic shapes 106 from being displaced during the casting process. Whether or not the porous container 116 is used, the uniformly packed preformed ceramic shapes 106 are configured such that the base metal 108 is able to substantially permeate the uniformly packed preformed ceramic shapes 106 during the casting process.

The porous body 118 may be configured to stiffen the composite wear part 102. For example, the porous body 118 may include one or more channels in the plurality of preformed ceramic shapes 106. The channels may receive the molten metal alloy cast around the porous body 118. The metal received in the one or more channels defines a truss structure formed integral with the base metal 108. The truss structure may compartmentalize the preformed ceramic shapes 106 into a plurality of sub regions to provide for applying a compression force to the preformed ceramic shapes 106 contained in each of the sub regions. For example, during solidification of the base metal 108 received by the one or more channels, the solidifying base metal 108 may provide a compression force directed towards the sub regions, packing the preformed ceramic shapes 106 in each of the sub regions together tightly. The tightly packed sub regions of preformed ceramic shapes 106 may prevent the preformed ceramic shapes 106 from sliding or being displaced relative to each other, thereby stiffening the composite wear part 102. For example, the truss structure may substantially reduce an amount the composite wear part 102 is displaced (e.g., bent, flexed, deformed, etc.) while in use.

The preformed ceramic shapes 106 may be arranged in multiple uniform layers 120(A) and 120(B) of preformed ceramic shapes 106 to build up additional thickness of ceramic material. For example, the preformed ceramic shapes 106 may pack together in a uniform way to increase a total depth 122 or thickness of ceramic material exposed to an abrasion, thereby extending a usable life of the composite wear part 102. For example, two or more uniform layers 120(A) and 120(B) of arrays of preformed ceramic shapes 106 may be arranged in an adjacent, subjacent, and/or overlapping manner. The layers 120(A) and 120(B) may include a series of preformed ceramic shapes 106 arranged in contact with one another, and may be arranged in an overlapping manner. In this specific example of one or more layers 120(A) and 120(B), the preformed ceramic shapes 106 are arranged in uniform arrays such that any interstitial space 124 between the preformed ceramic shapes 106 are minimized. For instance, a preformed ceramic shape 106 arranged in the layer 120(A) may cover an interstitial space 124 between two preformed ceramic shapes 106 in the layer 120(B) arranged below the preformed ceramic shape 106 in the layer 120(A). For example, the layers 120(A) and 120(B) of arrays of preformed ceramic shapes 106 may be arranged such that a preformed ceramic shape 106 in a top layer (e.g., layer 120(A)) covers, minimizes, or eliminates an interstitial space between preformed ceramic shapes 106 in a lower layer (e.g., layer 120(B)). During use of the composite wear part 102, the top layer may be exposed to an abrasion first, eventually wearing down to the lower layer, after which the lower layer is then exposed to the abrasion.

Figure 2:
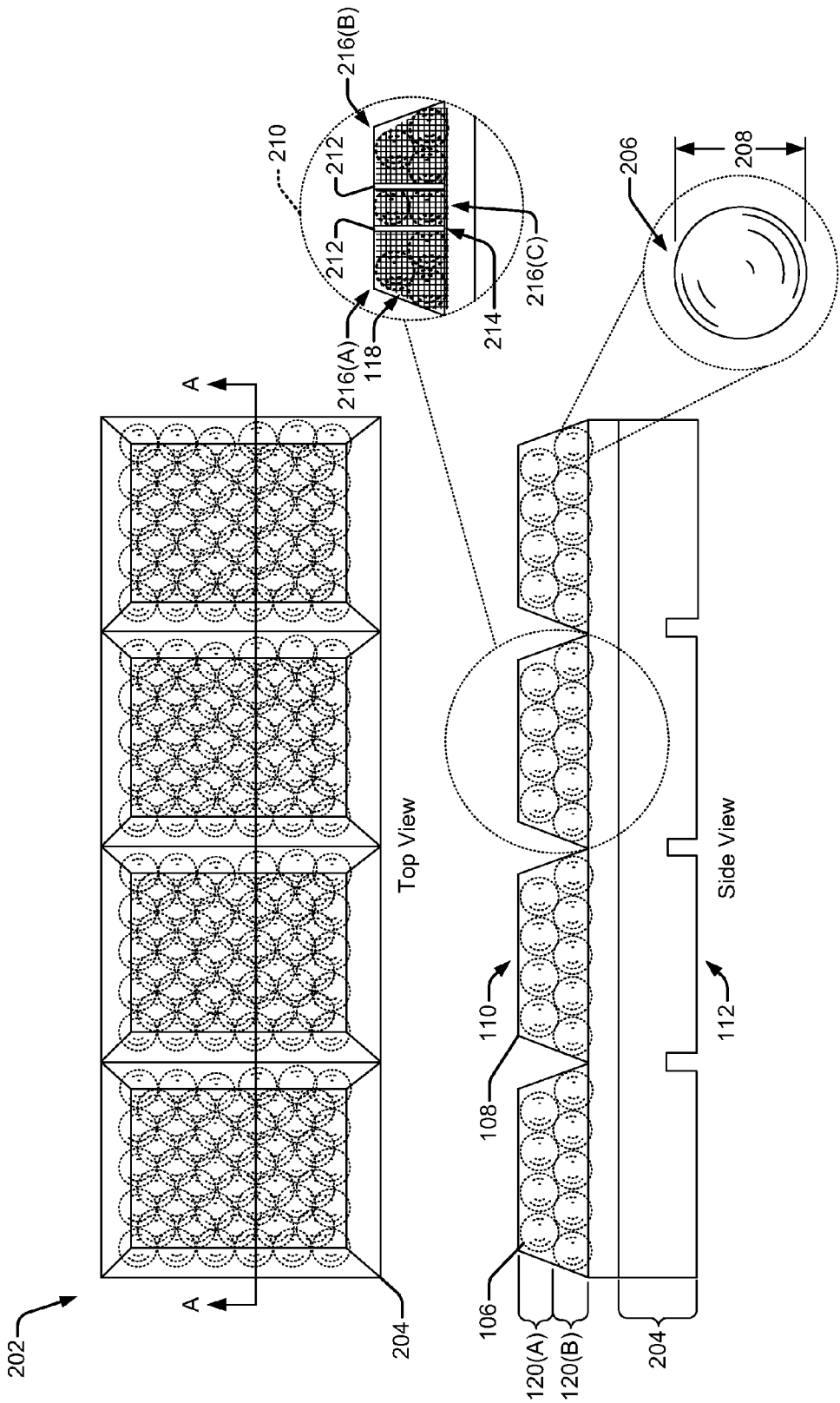
FIG. 2 illustrates an assembly of a composite wear part including a plurality of preformed ceramic shapes embedded in a base metal.

FIG. 2 illustrates an assembly of a composite wear part 202 including the plurality of preformed ceramic shapes 106 embedded in the base metal 108. While the composite wear part 202 is illustrated as an excavator wear bar, the composite wear part 202 may be any type of wear part. For example, the composite wear part 202 may be for use with a chute, a liner, a blade, a bucket, a track, a shroud, a tooth, a bit, or any other part exposed to abrasion.

The composite wear part 202 may include a mechanism 204 to removeably couple the composite wear part 202 to the piece of equipment 104 and/or to a tool to allow the composite wear part 202 to be removed and replaced at an end of a wear life of the composite wear part 202. Here, for example, the mechanism 204 is a portion of metal configured to be welded to the piece of equipment 104 (i.e., excavator). Further, the mechanism 204 may provide for removeably coupling the composite wear part 202, via welding, to a bucket of the piece of equipment 104. The composite wear part 202 may be installed on the piece of equipment 104 in an area that is exposed to abrasion.

Each of the preformed ceramic shapes 106 may comprise a uniform preformed geometry 206. For example, an engineer, a designer, an architect, etc., may specify or require a specific profile each of the preformed ceramic shapes 106 must comply with in order to be used in composite wear part 202. The engineer, designer, architect, etc., may explicitly describe a specific profile of the preformed ceramic shape 106 via geometric dimensioning and tolerancing (GD&T). For example, an engineer may provide geometric dimensioning and tolerancing to a supplier, manufacturer, retailer, etc. of ceramics that explicitly describe a nominal geometry, and/or the nominal geometry's allowable variation, of the preformed geometry 206 the preformed ceramic shapes 106 must comply with in order to be used in the composite wear part 202. The preformed ceramic shapes 106 may be manufactured by casting, electrofusion, sintering, flame spraying, pressing, or any other process allowing the preformed ceramic shapes 106 to be manufactured to the preformed geometry 206.

FIG. 2 illustrates the preformed geometry 206 as a sphere of ceramic having an outside diameter 208 of about 0.5 inches (1.3 centimeters). While FIG. 2 illustrates the preformed geometry 206 as a sphere, the preformed geometry 206 may be a cone, a jack, a half sphere, a cube, a pyramid, a bonded unit (e.g., bonded spheres, boned sphere and cone, bonded sphere and jack, bonded half spheres, etc.), etc.

Further, while FIG. 2 illustrates the composite wear part 202 being formed of a plurality of preformed ceramic shapes 106 having substantially the same preformed geometry 206 (i.e., spheres having an outside diameter of about 0.5 inches), the composite wear part 202 may be formed of a plurality of different preformed geometries 206. For example, the plurality of preformed ceramic shapes 106 forming the composite wear part 202 may include a first quantity of preformed ceramic shapes 106 having a first preformed geometry (e.g., a sphere having an outside diameter of about 0.5 inches), and a second quantity of preformed ceramic shapes 106 having a second preformed geometry (e.g., a sphere having an outside diameter smaller or larger than 0.5 inches). Further, the composite wear part 202 may be formed of a plurality of different preformed ceramic shapes 106 including spheres, cones, jacks, and/or bonded units (e.g., bonded spheres, boned sphere and cone, bonded sphere and jack, bonded half spheres, etc.).

The preformed ceramic shapes 106 may employ silicon carbide, alumina, zirconia, tungsten carbide, titanium carbide, boron carbide, zirconia-toughened alumina (ZTA), partially stabilized zirconia (PSZ) ceramic, silicon oxides, aluminum oxides with carbides, titanium oxide, brown fused alumina, combinations of any of these, or the like.

With the preformed ceramic shapes 106 employing a ceramic, the preformed ceramic shapes 106 may have a relatively high hardness, well suited to abrasion-resistant applications.

Further, with the preformed ceramic shapes 106 employing a ceramic, the preformed ceramic shapes 106 may have a relatively high hardness, that may provide for increased stiffness of the composite wear parts 202. For example, the preformed ceramic shapes 106 may increase the composite wear parts 202 resistance to bending relative to wear part without the preformed ceramic shapes 106.

As illustrated in side view 210, the composite wear part 202 may include the porous body 118 discussed above with regard to FIG. 1. Side view 210 illustrates the composite wear parts 202 may include one or more channels 212, void of preformed ceramic shapes 106. The one or more channels 212 may be arranged in the one or more layers 120(A) and 120(B) of uniform arrays of preformed ceramic shapes 106 to receive the base metal 108 during a casting of the composite wear parts 202. The base metal 108 received by the channels 212 may form a truss structure 214 that compartmentalizes the preformed ceramic shapes into multiple isolated sub regions 216(A), 216(B), and 216(C) within the composite wear part 202 to stiffen the composite wear part 202. For example, the truss structure 214 may provide for applying a compression force to the compartmentalized preformed ceramic shapes 106 during a solidification of the base metal 108. The compression force applied during the solidification of the base metal 108 may compress the preformed ceramic shapes 106 into a tighter lattice structure than if the same porous body 118 were made without the truss structure 214.

The composite wear part 202 may include a plurality of wear surfaces 110. As illustrated in FIG. 2 each of the wear surfaces 110 may include individual groups of the one or more layers 120(A) and 120(B) of uniform arrays of preformed ceramic shapes 106. One or more of the groups of the one or more layers 120(A) and 120(B) of uniform arrays of preformed ceramic shapes 106 may be positioned at a respective wear surface 110 without using a binding agent to retain the plurality of preformed ceramic shapes 106 at the respective wear surface 110. Further, one or more of the groups of the one or more layers 120(A) and 120(B) of uniform arrays of preformed ceramic shapes 106 may be arranged in a porous body 118 and positioned at a respective wear surface 110 location.

FIG. 2 also illustrates a section line A-A. The section line A-A is approximate to a center of the composite wear part 202.

Figure 3:
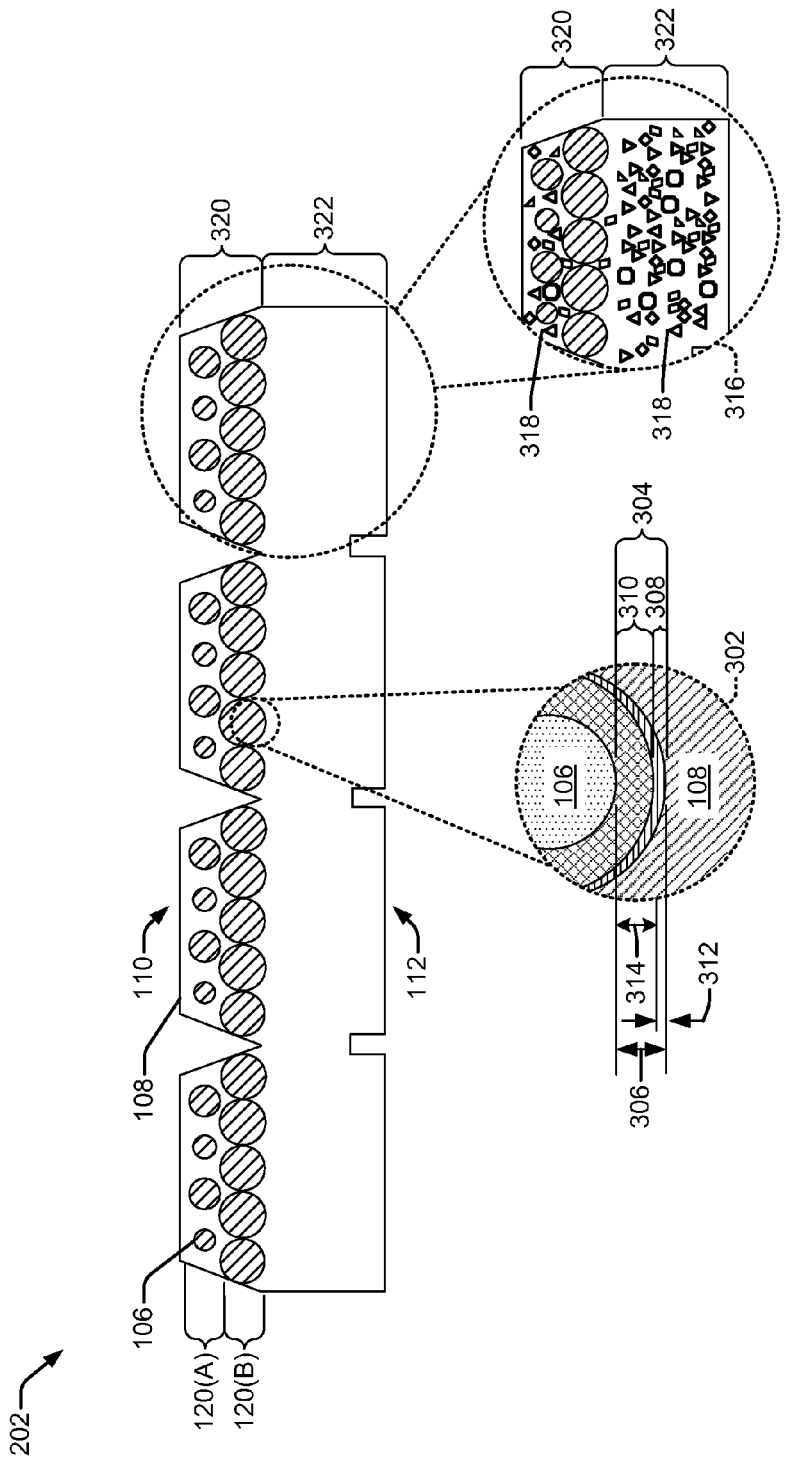
FIG. 3 illustrates a section view of the composite wear part taken along line A-A illustrated in FIG. 2.

FIG. 3 illustrates a section view of the composite wear part 202 taken along the section line A-A. FIG. 3 illustrates the plurality of preformed ceramic shapes 106 embedded in the base metal 108. For example, the base metal 108 may substantially permeate the plurality of preformed ceramic shapes 106 during a casting operation.

As illustrated in side view 302, a barrier layer 304 may cover (e.g., wrap, coat, enclose, etc.) each of the preformed ceramic shapes 106. The barrier layer 304 may have a wall thickness 306 dependent on a thermal expansion coefficient of the base metal 108 to be accommodated. The wall thickness 306 may also be dependent on a desired interstitial space between the preformed ceramic shapes 106. For example, the base metal 108 may be an iron alloy (e.g., FeMnAl) that encapsulates preformed ceramic shapes 106 formed of silicon carbide. The preformed ceramic shapes 106 may be wrapped in a barrier layer 304 having a wall thickness 306 which provides a desired interstitial space to allow the molten base metal 108 to permeate the interstitial spaces between the preformed ceramic shapes 106. The wall thickness 306 may be substantially uniform around each of the preformed ceramic shapes 106.

Further, the barrier layer 304 may include a first barrier layer 308 (e.g., a refractory layer) and a second barrier layer 310 (e.g., a compressible layer) to integrate or combine the preformed ceramic shapes 106 formed of silicon carbide with the base metal 108.

The first barrier layer 308 may be for preventing the base metal 108 from reacting with the preformed ceramic shapes 106 during a casting process, while the second barrier layer 310 may be for providing crush/compression protection during a cooling process. For example, the first barrier layer 308 may prevent a molten steel alloy from undesirably reacting with the preformed ceramic shapes 106 formed of silicon carbide, while the second barrier layer 310 may prevent the steel alloy from shrinking down onto the preformed ceramic shapes 106 and undesirably cracking either or both of the preformed ceramic shapes 106 and/or the solidified base metal 108.

The first barrier layer 308 may be formed of a metal film having a thickness 312 of at least about 0.001 inches (0.002 centimeters), and up to at most about 0.009 inches (0.02 centimeters). Further, the first barrier layer 308 may be an aluminum foil wrapped around both the second barrier layer 310 and the preformed ceramic shape 106, an electroplated deposit deposited around both the second barrier layer 310 and the preformed ceramic shape 106, a coating (e.g., a powder coating, a liquid coating, etc.) applied around both the second barrier layer 310 and the preformed ceramic shape 106, or the like suitable for preventing a molten steel alloy from undesirably reacting with the preformed ceramic shape 106 formed of silicon carbide. For example, the first barrier layer 308 may be formed of an aluminum foil having a thickness 312 of about 0.002 inches (0.005 centimeters), and wrapped around both the second barrier layer 310 and the preformed ceramic shape 106.

The second barrier layer 310 may be formed of an alumina fiber, a porous ceramic, a powder (e.g., a compacted powder, a powdered metallurgy), or the like suitable for preventing a steel alloy from shrinking down onto the preformed ceramic shapes 106 formed of silicon carbide and undesirably cracking either or both of the preformed ceramic shape 106 and/or the solidified base metal 108. For example, the second barrier layer 310 may be formed of an alumina fiber having a thickness 314 of at least about 0.050 inches (0.13 centimeters), and up to at most about 0.060 inches (0.15 centimeters), and wrapped around the preformed ceramic shape 106. The second barrier layer 310 may be disposed between the first barrier layer 308 and each of the preformed ceramic shape 106.

While the side view 302 illustrates the barrier layer 304 including two barrier layers, (i.e., the first barrier layer 308 and second barrier layer 310), the barrier layer 304 may include any number of layers. For example, the barrier layer 304 may comprise multiple alternating layers of the first barrier layer 308 and the second barrier layer 310.

FIG. 3 includes detail side view 316 which illustrates an embodiment in which an additive 318 is disposed in portions of the base metal 108. The additive 318 may be a grit formed of a ceramic, a metal, a mixture of ceramic and metal, or the like. Side view 316 illustrates the composite wear part 202 may include the additive 318 in a first portion 320 (e.g., a top portion) of the base metal 108 of the composite wear part 202 and/or in a second portion 322 (e.g., a bottom portion) of the base metal 108 of the composite wear part 202. While the side view 316 illustrates the additive 318 dispersed throughout the first portion 320 and the second portion 322 of the base metal, the additive 318 may be dispersed throughout the first portion 320, while the second portion 322 may not have the additive 318 dispersed throughout the second portion 322, or vice versa. The additive 318 may be dispersed evenly (e.g., with about a same density) or unevenly (e.g., with about a higher density relative to a lower density) in the first portion 320 and/or the second portion 322. Further, the additive 318 dispersed throughout the first portion 320 may be dispersed about the preformed ceramic shapes 106.

Figure 4:
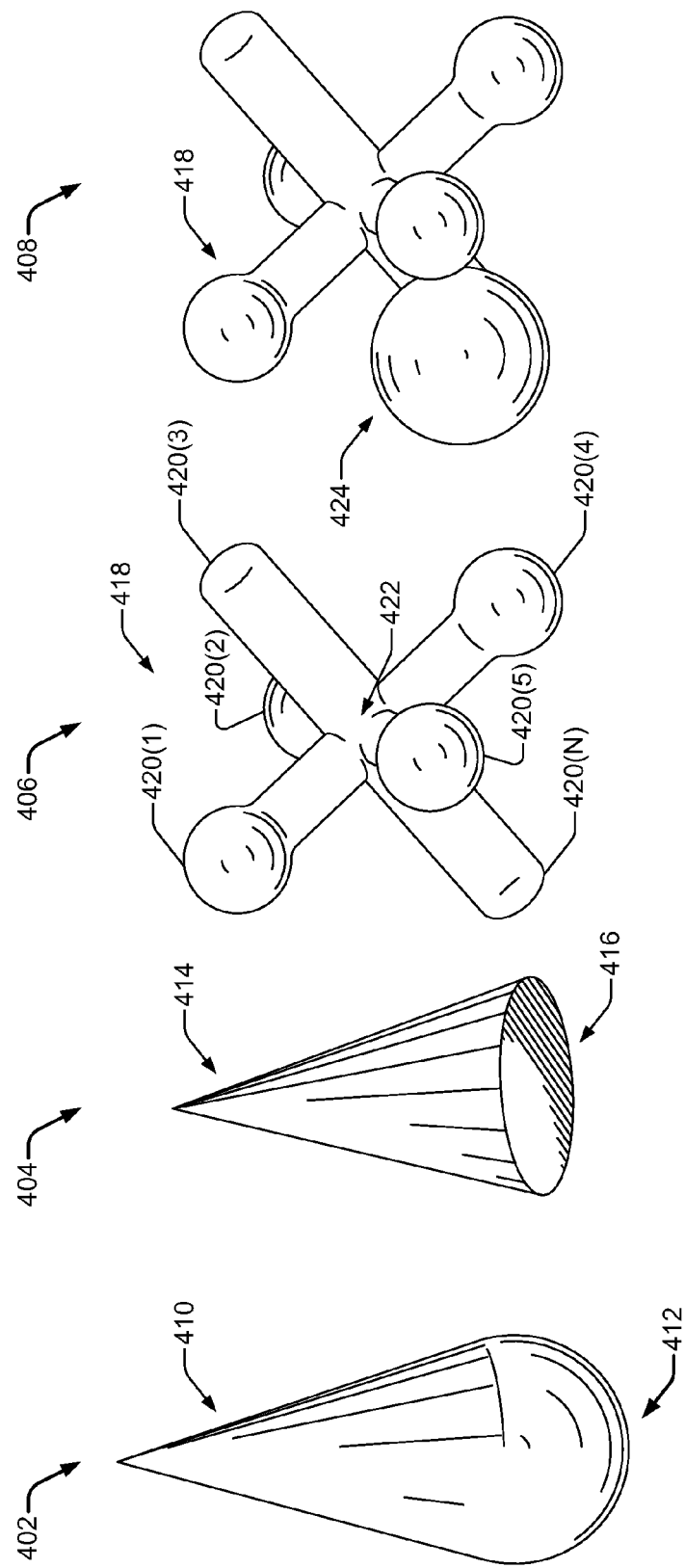
FIG. 4 illustrates multiple embodiments of preformed ceramic shapes that may be used to provide abrasion protection for a composite wear part.

FIG. 4 illustrates embodiments 402, 404, 406, and 408 of preformed ceramic shapes 106 that may be used as abrasion-resistant components in composite wear parts 102. Each embodiment 402-408 illustrating a different preformed geometry 206 of a preformed ceramic shape 106. The embodiment 402 illustrates a preformed geometry 206 as a cone 410 having a spherical base 412. The embodiment 404 illustrates a preformed geometry 206 as a cone 414 with a planar base 416. Embodiment 406 illustrates a preformed geometry 206 as a jack 418. The jack 418 may include a plurality of points 420(1), 420(2), 420(3), 420(4), 420(5), and 420(N), and or knobs extending from a common base 422. Here, the jack 418 is illustrated in FIG. 4 having six points 420(1)-420(N) extending away from the common base 422. The jack 418 may include any number of points extending away from a common base and may comprise different shaped points. For example, and as illustrated in FIG. 4, four of the six points 420(1)-420(N) have a spherical shaped end, while the remaining two points have cylindrical shaped ends. Because the points 420(1)-420(N) extend away from the common base 422, the points 420(1)-420(N) anchor the preformed ceramic shapes in a base metal, retaining the preformed ceramic shapes in the base metal until the preformed ceramic shape is worn down by the abrasion. The embodiment 408 illustrates a preformed geometry as a sphere 424 bonded to a jack 418.

Depending on the specific application, one or more of the preformed ceramic shape embodiments 402-408 may be used to form a composite wear part 102. For example, the jack 418 may be arranged in the one or more layers 120(A) and 120(B) to form a lattice-like or crystalline-like structure to provide for packing the preformed ceramic shapes together tightly, as well as to anchor the jacks 418 in the base metal 108.

Example Methods of Forming Composite Wear Parts

Figure 5:
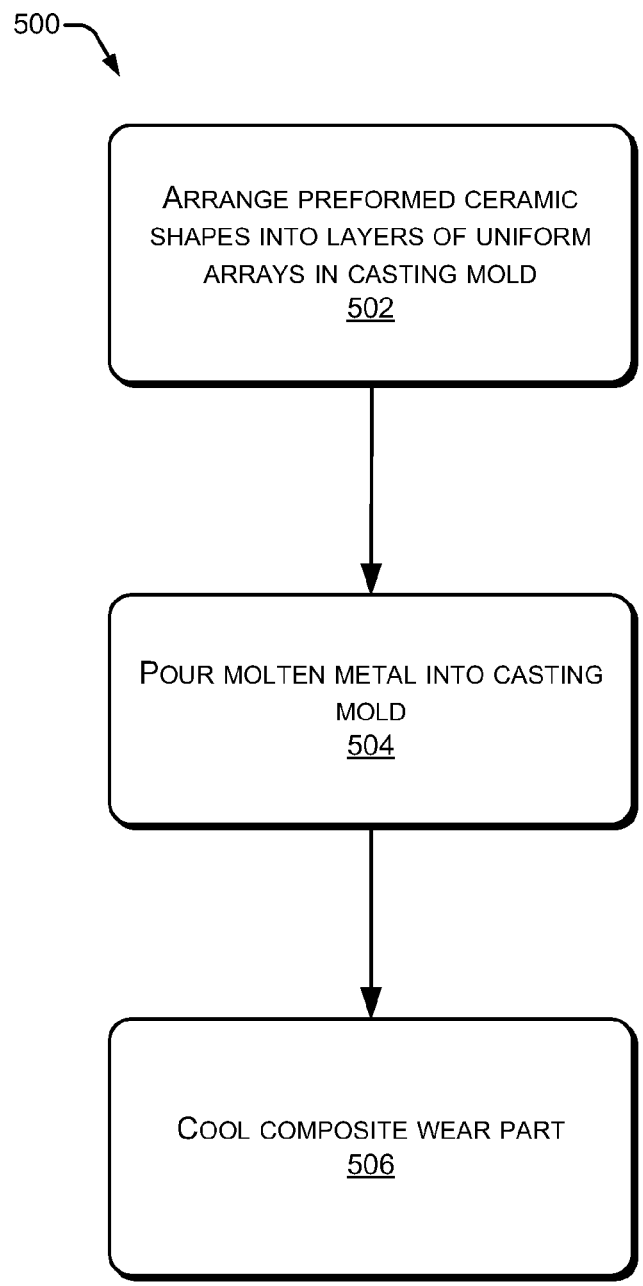
FIG. 5 is a flow diagram illustrating an example process of manufacturing a composite wear part with a plurality of preformed ceramic shapes embedded in a base metal.

FIG. 5 illustrates an example process 500 of manufacturing a composite wear part (e.g., composite wear part 102 and/or 202). By way of example and not limitation, this process may be performed at a manufacturing facility, a plant, a foundry, a factory, or the like.

Process 500 includes operation 502, which represents arranging a plurality of preformed ceramic shapes (e.g., preformed ceramic shapes 106) into one or more layers of uniform arrays (e.g., uniform layers 120(A) and 120(B)) in a casting mold. The casting mold may be a sand mold that may be arranged to form the shape of the composite wear part. The arranging may include packing the plurality of preformed ceramic shapes together in a uniform way to provide for being positioned at a location (e.g., at wear surface 110) in the composite wear part exposed to an abrasion. The plurality of preformed ceramic shapes may be configured to pack together in a uniform way without using a binding agent to retain the plurality of preformed ceramic shapes at the location.

Operation 502 may be followed by operation 504, which represents pouring molten metal (e.g., base metal 108) into the casting mold. For example, the molten base metal may be poured into a casting shell and envelop the plurality of preformed ceramic shapes arranged in the one or more layers of uniform arrays. The base metal may be any type of steel or metal that may be desirable for resisting wear from abrasion. In a specific example, the steel alloy may be steel alloy 4140 or 8630 under the American Iron and Steel Institute (AISI) standard. In other specific examples, the steel alloy may be a stainless steel alloy or FeMnAl.

In some embodiments, one or more of the preformed ceramic shapes may be encapsulated with a barrier layer (e.g., barrier layer 304). For example, the preformed ceramic shapes may be covered (e.g., wrapped, coated, enclosed, etc.) with a barrier layer to integrated with the base metal being poured into the casting shell. As discussed above the barrier layer may prevent the base metal from reacting with the preformed ceramic shapes during casting, and/or provide crush/compression protection during cooling.

Process 500 may be completed at operation 506, which represents cooling the composite wear part. For example, a metal layer may solidify around the surface of the preformed ceramic shapes as energy or heat dissipates from the composite wear part. The cooling may be at a relatively slow cooling rate for a predetermined period of time, and may be in a temperature controlled environment (e.g., a cooling tunnel, furnace, or the like). The casting, including the metal layer and the preformed ceramic shapes defining a composite wear part. The controlled cooling may be implemented by decreasing the amount of energy being exposed to the composite wear part. Alternatively, the composite wear part may be allowed to cool in a temperature controlled environment that limits the cooling rate without introducing outside energy or heat. The cooling rate and the predetermined period of time may be at a "slow rate." As used herein, the term "slow rate" means a rate slower than a rate at which the component would air cool if placed in a location at standard temperature and pressure. The specific slow rate of cooling and the specified period of time depend on the specific combination of ceramic material and base metal, size and shape of the ceramic elements, and the desired material properties of the composite material. In some embodiments, the casting shell and the composite wear part may be cooled at a continuous slow rate until it reaches a predetermined temperature (e.g., 50% of the pouring temperature, 20% of the pouring temperature, room temperature, etc.). Examples of continuous slow rates of cooling that may be used in various embodiments include rates at most about 300 degrees F. per hour, at most about 200 degrees F. per hour, at most about 150 degrees F. per hour, or at most about 100 degrees F. per hour.

Figure 6:
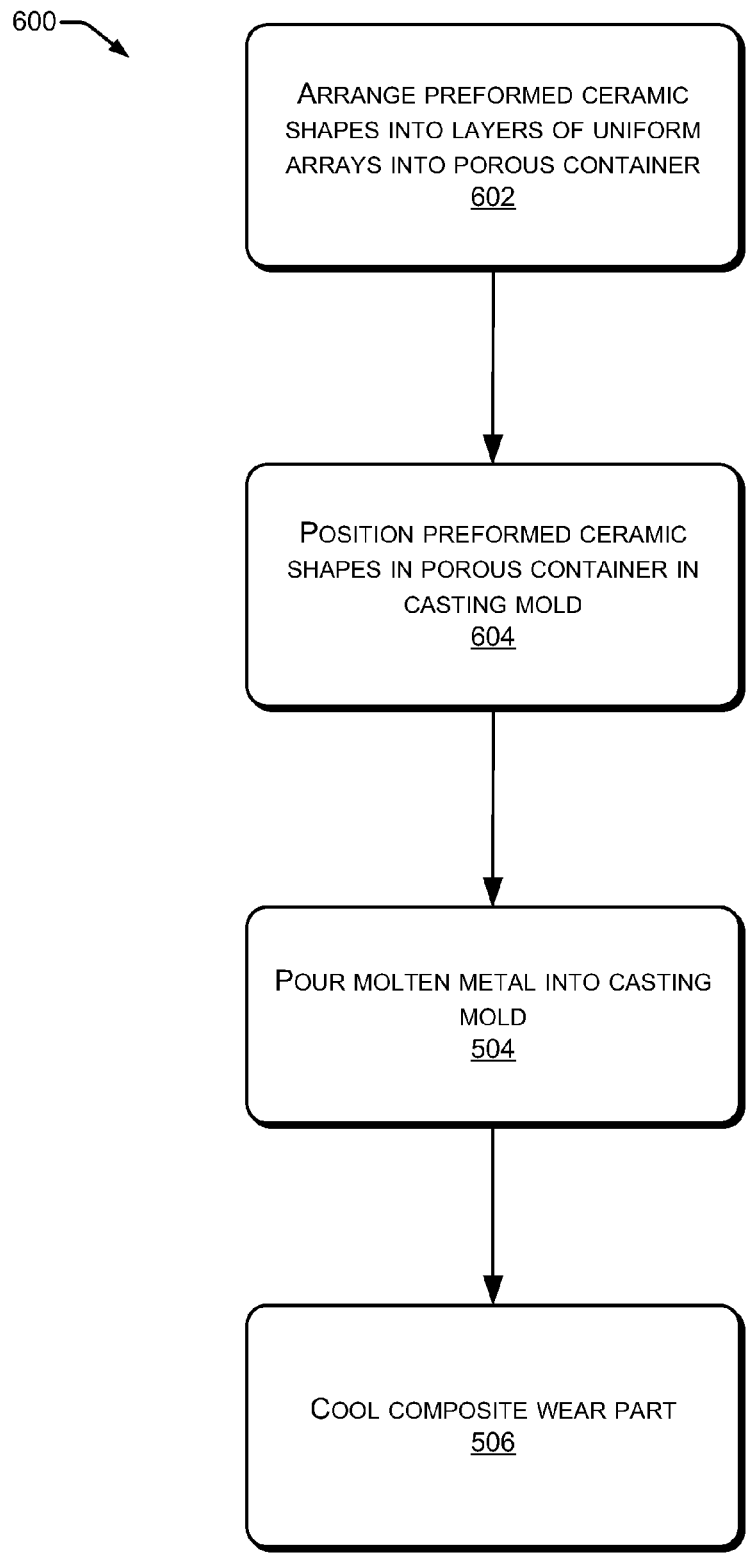
FIG. 6 is a flow diagram illustrating another example process of manufacturing a composite wear part with a plurality of preformed ceramic shapes embedded in a base metal.

FIG. 6 illustrates another example process 600 of manufacturing the composite wear part. Similar to process 500, process 600, by way of example and not limitation, may be performed at a manufacturing facility, a plant, a foundry, a factory, or the like. Further, one or more operations of process 600 may be performed in the field or at a second manufacturing facility (e.g., an assembly plant).

Process 600 includes operations 602, which represent arranging the plurality of preformed ceramic shapes into one or more layers of uniform arrays into a porous container (e.g., porous container 116). The porous container may be permeable to molten metal and may retain the plurality of preformed ceramic shapes in a desired shape during the casting process 600. The plurality of preformed ceramic shapes retained by the porous container defining a porous body (e.g., porous body 118). Further, and as discussed above with regard to FIG. 2, the porous container may include one or more channels (e.g., channels 212) that may receive the molten metal and form a truss structure (e.g., truss structure 214). The truss structure may provide for stiffening the composite wear part.

Operation 602 may be followed by operation 604, which represents positioning the plurality of preformed ceramic shapes in the porous body in a casting mold. The casting mold may be a sand mold that may be arranged to form the shape of the composite wear part. The position of the porous body in the casting mold may be a location in the composite wear part exposed to an abrasion (i.e., at a wear surface of the wear part).

Process 600 may include operations 504 and 506, which, as discussed above with regard to process 500 illustrated in FIG. 5, represent pouring molten metal into the casting mold, and cooling the composite wear part, respectively.

CONCLUSION

Although the disclosure uses language specific to structural features and/or methodological acts, the claims are not limited to the specific features or acts described. Rather, the specific features and acts are disclosed as illustrative forms of implementing the invention. For example, the various embodiments described herein may be rearranged, modified, and/or combined. As another example, one or more of the method acts may be performed in different orders, combined, and/or omitted entirely, depending on the composite wear parts to be produced.

What is claimed is:

1. A composite wear part to provide abrasion resistance for a tool, the composite wear part comprising:
   a mechanism to removeably couple the composite wear part to a tool to provide for replacing the composite wear part;
   a base metal;
   a plurality of preformed ceramic shapes embedded in the base metal, the base metal substantially permeating the plurality of preformed ceramic shapes, and the preformed ceramic shapes comprising:
      a plurality of elements having a uniform, preformed geometry, the preformed geometry being such that the plurality of preformed ceramic shapes are configured to pack together in a uniform way to provide for being positioned at a location in the composite wear part exposed to an abrasion without using a binding agent to retain the plurality of preformed ceramic shapes at the location.

2. The composite wear part of claim 1, the tool comprising a chute, a liner, a blade, a bucket, a track, a shroud, a tooth, or a bit.

3. The composite wear part of claim 1, wherein the composite wear part is formed by arranging the plurality of preformed ceramic shapes in one or more layers of uniform arrays and retaining the plurality of preformed ceramic shapes by a porous container, the plurality of preformed ceramic shapes retained by the porous container defining a porous body, the porous body to position the plurality of preformed ceramic shapes at the location in the composite wear part.

4. The composite wear part of claim 1, wherein the plurality of preformed ceramic shapes comprises a first quantity of the preformed ceramic shapes and a second quantity of the preformed ceramic shapes, and
   wherein each of the preformed ceramic shapes of the first quantity have a first preformed geometry, and each of the preformed ceramic shapes of the second quantity have a second preformed geometry different from the first preformed geometry.

5. The composite wear part of claim 1, wherein each of the plurality of preformed ceramic shapes has substantially the same preformed geometry.

6. The composite wear part of claim 5, wherein the preformed geometry is substantially sphere shaped.

7. The composite wear part of claim 6, wherein the sphere has an outer diameter of about 0.5 inches (1.3 centimeters).

8. The composite wear part of claim 5, wherein the preformed geometry is substantially cone shaped.

9. The composite wear part of claim 5, wherein the preformed geometry is substantially jack shaped.

10. A composite wear part removeably coupled to a piece of equipment, the composite wear part comprising:
    a body having a wear surface, the body comprising:
       a base metal; and
       a plurality of preformed ceramic shapes embedded in the base metal, the preformed ceramic shapes comprising:
          a plurality of elements having a uniform, preformed geometry, the preformed geometry being such that the plurality of preformed ceramic shapes are configured to pack together in a uniform way to provide for being positioned over at least a portion of the wear surface to improve resistance of the wear surface to abrasion.

11. The composite wear part of claim 10, the equipment comprising a conveyor system, an excavator, a tracked vehicle, or a haul truck.

12. The composite wear part of claim 10, wherein the plurality of preformed ceramic shapes comprise alumina and/or zirconia.

13. The composite wear part of claim 10, further comprising an additive comprising a ceramic grit disposed in the base metal.

14. The composite wear part of claim 10, wherein the base metal comprises a steel alloy.

15. The composite wear part of claim 14, wherein the steel alloy comprises FeMnAl.

16. The composite wear part of claim 10, wherein the base metal comprises a steel alloy and the plurality of preformed ceramic shapes comprise silicon carbide preformed ceramic shapes, and wherein each silicon carbide preformed shape is encapsulated with a barrier layer.

17. The composite wear part of claim 16, wherein the barrier layer comprises:
    a first layer, encapsulating each silicon carbide preformed shape, to prevent the steel alloy from reacting with the plurality of preformed silicon carbide ceramic shapes during the casting of the steel alloy around the porous body; and
    a second layer, disposed between the first layer and each silicon carbide preformed shape, to provide crush protection between the steel alloy and each silicon carbide preformed shape during a cooling of the ballistic-resistant composite.

18. The composite wear part of claim 17, wherein the first layer is a metal film and the second layer is an alumina fiber.

19. An abrasion-resistant composite component comprising:
    a body having a wear surface exposed to an abrasion, the body comprising:
       a plurality of preformed ceramic shapes arranged in one or more layers of uniform arrays and embedded in a base metal, and the preformed ceramic shapes comprising, a plurality of elements having a uniform, preformed geometry, the preformed geometry being such that the plurality of preformed ceramic shapes are configured to be:
packed together in a uniform way; and
positioned over at least a portion of the wear surface exposed to the abrasion to improve resistance of the wear surface to the abrasion.

20. The abrasion-resistant composite component of claim 19, wherein the one or more layers of uniform arrays of preformed ceramic shapes have a substantially parallel orientation to the wear surface exposed to the abrasion.

21. The abrasion-resistant composite component of claim 19, wherein the preformed geometry comprises a sphere shaped geometry, a cone shaped geometry, or a jack shaped geometry.

* * * * *